United States Patent
Kelly et al.

(10) Patent No.: US 9,179,248 B2
(45) Date of Patent: Nov. 3, 2015

(54) METHODS AND DEVICES FOR POSITION DETERMINATION USING REGIONAL MINIMAL RESIDUAL ESTIMATION

(71) Applicant: MCUBE, INC., San Jose, CA (US)

(72) Inventors: Joseph M. Kelly, Center Point, IA (US); John E. Acheson, Sioux Falls, SD (US)

(73) Assignee: mCube Inc., San Jose, CA (US)

( * ) Notice: Subject to any disclaimer, the term of this patent is extended or adjusted under 35 U.S.C. 154(b) by 289 days.

(21) Appl. No.: 13/846,917

(22) Filed: Mar. 18, 2013

(65) Prior Publication Data
US 2013/0244692 A1     Sep. 19, 2013

Related U.S. Application Data

(60) Provisional application No. 61/612,244, filed on Mar. 16, 2012.

(51) Int. Cl.
*H04W 4/02*     (2009.01)
*H04W 64/00*    (2009.01)
*G01S 5/14*      (2006.01)

(52) U.S. Cl.
CPC .. *H04W 4/02* (2013.01); *G01S 5/14* (2013.01); *H04W 64/00* (2013.01)

(58) Field of Classification Search
CPC ....... H04W 64/00; H04W 4/02; H04W 48/04; G01S 5/14; G01S 5/02
See application file for complete search history.

(56) References Cited

U.S. PATENT DOCUMENTS

| | | | | |
|---|---|---|---|---|
| 3,659,085 | A * | 4/1972 | Potter et al. | 701/518 |
| 8,098,200 | B1 * | 1/2012 | Gines | 342/465 |
| 2004/0162084 | A1 * | 8/2004 | Wang | 455/456.1 |
| 2004/0203880 | A1 * | 10/2004 | Riley | 455/456.1 |
| 2005/0192024 | A1 * | 9/2005 | Sheynblat | 455/456.1 |
| 2007/0139269 | A1 * | 6/2007 | Chen et al. | 342/450 |
| 2009/0171583 | A1 * | 7/2009 | DiEsposti | 701/213 |

* cited by examiner

*Primary Examiner* — William Nealon
(74) *Attorney, Agent, or Firm* — Kilpatrick Townsend and Stockton LLP (57) ABSTRACT

A computer-implemented method and device for determining a user position, implemented in a user handheld computing device programmed to perform the method. The method includes solving for the position of a user based on ranges, which are computed by estimating power loss between a user and a number of Wi-Fi Access Points. Embodiments of the present invention includes a method that is designed to accommodate the non-linear nature of solving a position solution using power estimates. This method includes solving a two-dimensional solution grid of position residuals, or magnitudes of error between true and computed ranges, using signal strength measurements from multiple Wi-Fi access points in order to determine local minima of the position residuals indicating a user position. Standard approaches in the area such as a Least Squares Solution overly simplify the non-linear components resulting in poor performance.

17 Claims, 7 Drawing Sheets

| 10 | 5 | 7 |
| --- | --- | --- |
| 5 | 2 | 3 |
| 7 | 3 | 4 |

METHODS AND DEVICES FOR POSITION DETERMINATION USING REGIONAL MINIMAL RESIDUAL ESTIMATION

CROSS-REFERENCES TO RELATED APPLICATIONS

The present application claims priority to and incorporates by reference, for all purposes, the following patent application: U.S. Provisional App. No. 61/612,244, filed Mar. 17, 2012. The present application also incorporates by reference the following patent applications: U.S. patent application Ser. No. 13/758,707, filed Feb. 4, 2013, U.S. patent application Ser. No. 13/758,486, filed Feb. 4, 2013, and U.S. patent application Ser. No. 13/776,525, filed Feb. 25, 2013.

BACKGROUND OF THE INVENTION

The present invention relates to portable device navigation/positioning methods and devices. More specifically, embodiments of the present invention relate to methods and devices using data from Wi-Fi Access points for navigation/positioning purposes.

The use of navigational tools within portable handheld devices has been widespread in contemporary society. The ability to quickly and accurately determine a user's location and heading toward a desired destination is highly desirable. Conventional tools for navigation have included systems that implement GPS or other Radio-Frequency based positioning methods. However, these methods require frequent updating to remain accurate. As GPS and other Radio-Frequency based positioning become either degraded or completely unavailable, systems that utilize these methods are rendered useless.

From the above, it is seen that techniques for improving operation of navigational systems and methods are highly desired.

BRIEF SUMMARY OF THE INVENTION

The present invention relates to portable device navigation/positioning methods and systems. More specifically, embodiments of the present invention relate to methods and devices using data from Wi-Fi Access points for navigation/positioning purposes and systems thereof. These devices can include integrated MEMS devices and related structures, which can be implemented in mobile phones, tablets, hand-held computers, and the like. Merely by way of example, the MEMS devices can include at least an accelerometer, a gyroscope, a magnetic sensor, a pressure sensor, a microphone, a humidity sensor, a temperature sensor, a chemical sensor, a biosensor, an inertial sensor, and others. But it will be recognized that the invention has a much broader range of applicability.

In an embodiment, the present invention provides a computer-implemented method for determining a user position provided in a handheld user computing device configured to perform the method, which can include several steps such as including receiving a starting user position estimate from an outside initialization source and receiving a plurality of Wi-Fi signals from a plurality of Wi-Fi access points. Each of the plurality of Wi-Fi signals can be associated with one of the plurality of Wi-Fi access points. The outside initialization source can include a global positioning system (GPS), an inertial navigation device, an image-based position fix, or an absolute fix using Wi-Fi data, or the like.

In an embodiment, the method can include determining a plurality of signal strength measurements, where each of the signal strength measurements can be associated with one of the plurality of Wi-Fi signals. A plurality of access point locations can be determined, where each of the access point locations being associated with one of the plurality of Wi-Fi access points. The method 600 can also include determining a total solution residual across a two-dimensional search grid using the starting user position estimate and the plurality of signal strength measurements and the plurality of access point locations.

In a specific embodiment, the process of determining the total solution residual can include determining a position residual for each point in the two-dimensional search grid, as described previously. The determining of a position residual can include determining the sum of magnitude of the position errors across the plurality of Wi-Fi access points. The position errors can be the difference between a true range and a computed range, the true range being determined by the plurality of access point locations and the computed range being determined by the received power levels of each of the plurality of signal strength measurements.

The two-dimensional solution grid having dimensions N×M where N is greater than 2 and M is greater than 2 and can be determined by a 2-axis covariance, a Figure of Merit, or an indicator or relative uncertainty in user position. The starting user position estimate can be used to determine a solution region for the two-dimensional solution grid. Furthermore, the method 600 can include determining in the handheld user device, an estimated user position based on the minimized position residual of the total solution residual within the solution region. Other steps can be performed as desired.

In various embodiments, the handheld user computing device includes an inertial navigation system or inertial sensing system, and also includes using the inertial navigation system or inertial sensing system to only search for regions of convergence near a most recent estimate of the user position In an embodiment, the present invention provides a handheld user computing device specifically programmed by executable software code to determine a user position. This device can include a physical sensor configured to determine a plurality of signal strength measurements in response to plurality of signals from a plurality of access points, a memory configured to store executable software, and a processor coupled to the physical sensor and the memory, wherein the processor is programmed by the executable software to perform the method steps as described previously.

Many benefits are achieved by the way of the present invention over conventional techniques. These benefits can include providing an efficient method of solving for local minima points vs. the absolute minima of the line of sight residuals, which can be used for navigation/position applications. This method also allows for better performance when integrated with an inertial navigation system to only search for regions of convergence near the most recent estimate.

Various additional objects, features and advantages of the present invention can be more fully appreciated with reference to the detailed description and accompanying drawings that follow.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

The present invention relates to portable device navigation/positioning methods and systems. More specifically, embodiments of the present invention relate to methods and devices using data from Wi-Fi Access points for navigation/positioning purposes and systems thereof. These systems can include integrated MEMS devices and related structures, which can be implemented in mobile phones, tablets, hand-held computers, and the like. Merely by way of example, the MEMS devices can include at least an accelerometer, a gyroscope, a magnetic sensor, a pressure sensor, a microphone, a humidity sensor, a temperature sensor, a chemical sensor, a biosensor, an inertial sensor, and others. But it will be recognized that the invention has a much broader range of applicability.

In order to solve for the position of a user based on ranges which are computed by estimating power loss between a user and a number of Wi-Fi Access Points, a system was developed. Embodiments of the present invention include a Regional Minimum Residual Estimation Filter method or RMREF method that is designed to accommodate the non-linear nature of solving a position solution using power estimates. Standard approaches in the area such as a Least Squares Solution overly simplify the non-linear components resulting in poor performance.

Figure 1:
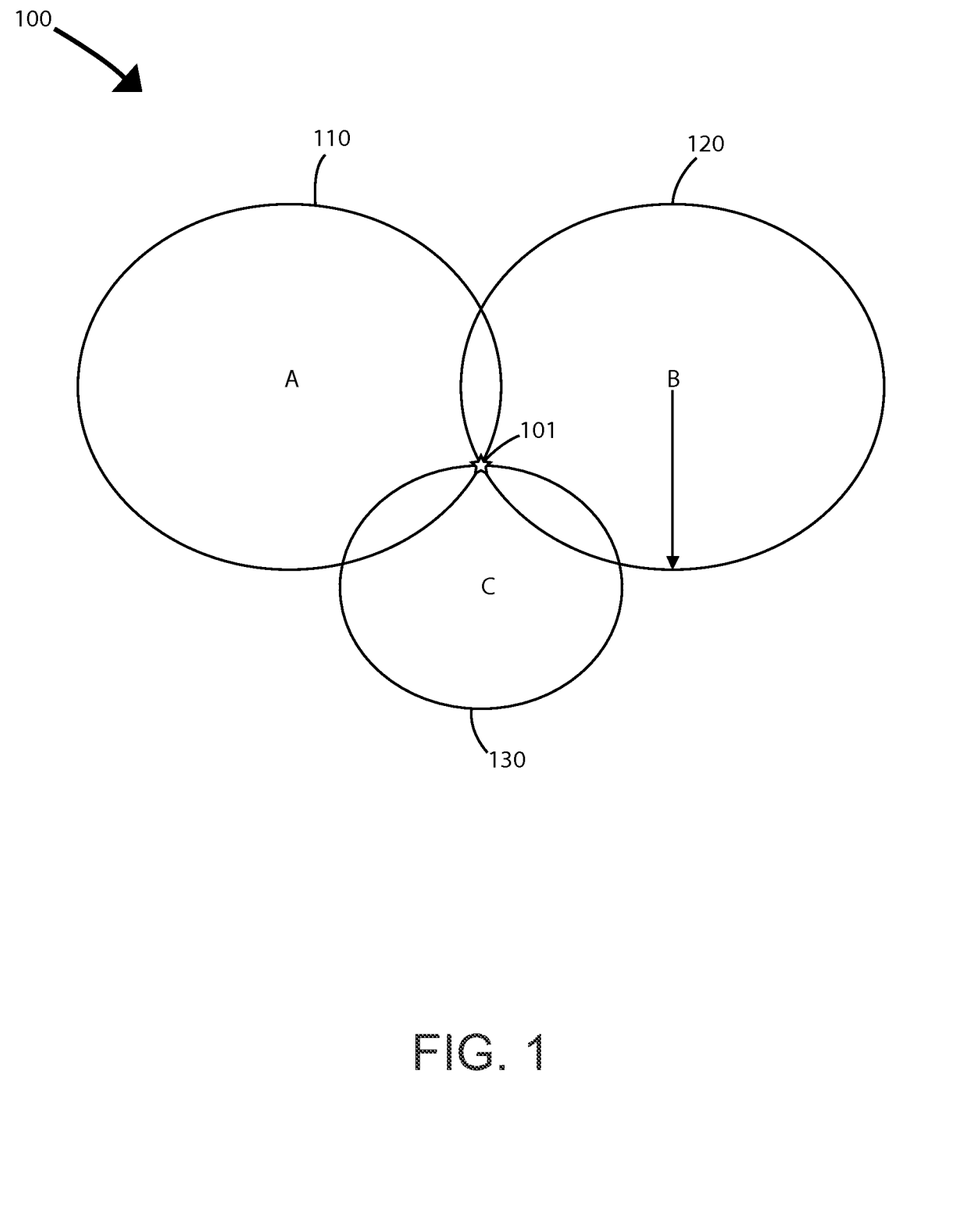
FIG. 1 illustrates a simplified diagram of position estimation method using multiple Wi-Fi access points according to an embodiment of the present invention.
Figure 2:
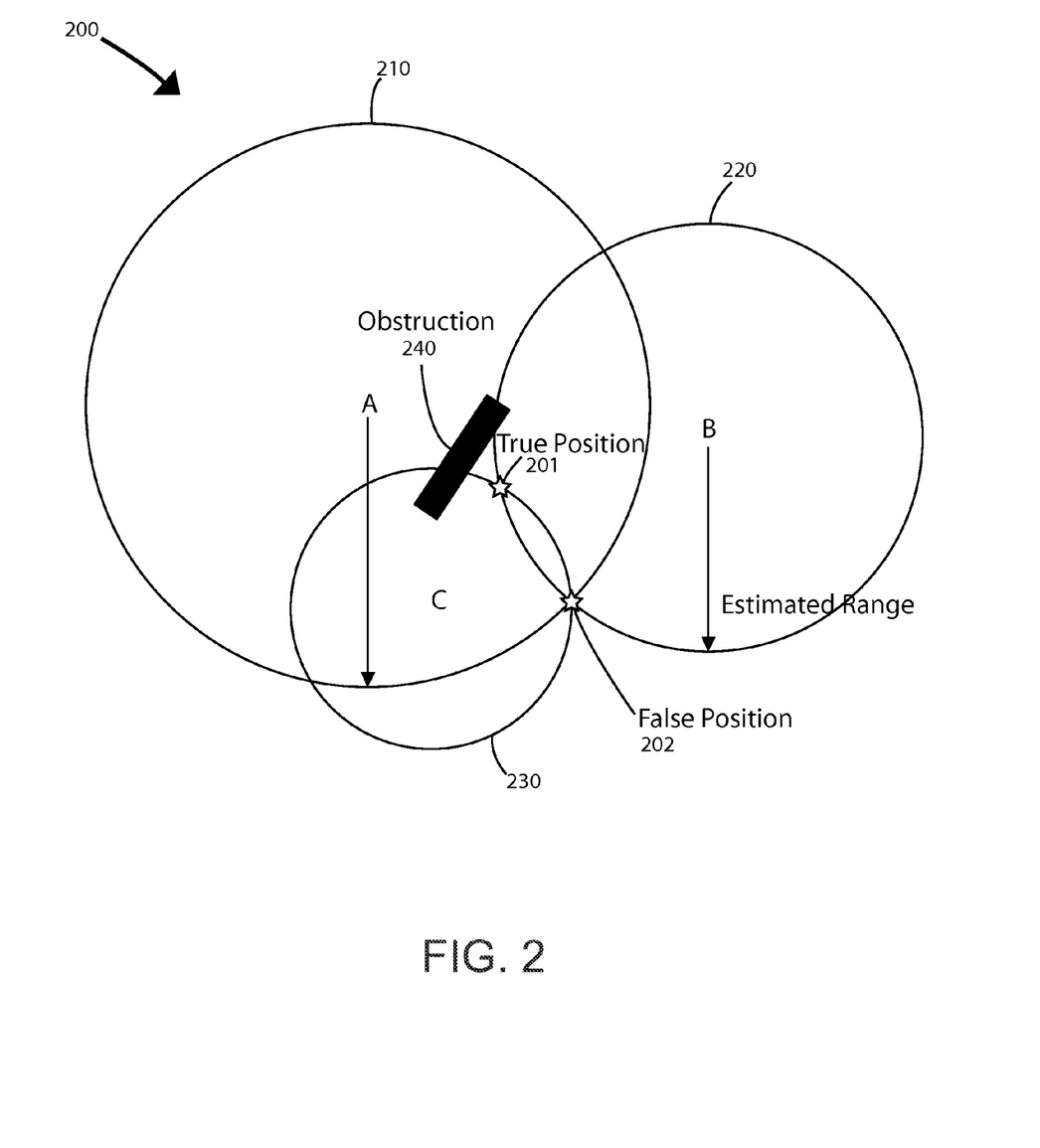
FIG. 2 illustrates a simplified diagram of position estimation method using multiple Wi-Fi access points with an obstruction according to an embodiment of the present invention.

The present invention is novel in that it uses an alternative approach, versus the industry standard least squares estimator. In a least squares system, it is assumed that the errors formed by the residual measurements are linear over a large spatial area. This assumption can lead to position estimates that have very large errors due to the non-linear nature of the system. The prime example is when the user has a large obstruction that reduces signal strength to all access points on one side. This reduction in received signal strength will make those ranges appear to be much larger, and will thus lead to false solutions that are inconsistent with that which would be determined by using the rest of the access points, which are not impacted by this effect. FIGS. 1 and 2 below illustrate qualitatively how obstructions can cause false position estimates to be computed.

FIG. 1 illustrates a simplified diagram of a position estimation method using multiple Wi-Fi access points with an obstruction according to an embodiment of the present invention. This figure illustrates an ideal case of a tri-lateration solution 100 for estimating a location of a user at point 101. This method uses the Wi-Fi fields of Wi-Fi sources A (110), B (120), C (130). The field circles represent the ranges of signal power for each source. The intersection of all three fields gives an estimation of the user's position at 101.

FIG. 2 illustrates a simplified diagram of position estimation method using multiple Wi-Fi access points with an obstruction according to an embodiment of the present invention. This figure illustrates a non-ideal case of a tri-lateration solution 200 for estimating a location of a user at point 201. Similar to FIG. 1, this method uses Wi-Fi fields of Wi-Fi sources A (210), B (220), C (230). Because of the obstruction 240 between the user and transmitter A, the received signal power (of field range 210) is much less and a longer range is computed from this transmitter since it looks to the receiver like additional spatial loss. This longer range will cause linear estimation functions like a Least Squares to yield erroneous multiple position solutions as shown by the additional false position 202. While obstructions like this could ideally be tracked by step changes in the individual range measurements, it is not very realistic to monitor this in real time due to the high frequency with which obstructions can come and go (such as the user's body, or walls nearby a route of travel) and the low sample rates possible with typical Wi-Fi strength measurements.

Instead, the computed position residuals are defined as the sum of the difference between the true range for a user position, using knowledge of Access Point location, and the estimated range based on received power level. Using this definition, when the final position residual is minimized, it does not necessarily imply zero position error; it only implies that all estimated ranges are consistent with a candidate position in the spatial domain. Due to the signal obstruction described above, this candidate position may not be the real user position. In the example scenario shown in FIG. 2, the position residuals can be computed along one spatial axis to illustrate this point. In one of the horizontal axes, the user's equipment would have a computed error residual across the horizontal dimension similar to what is shown in FIG. 3.

Figure 3:
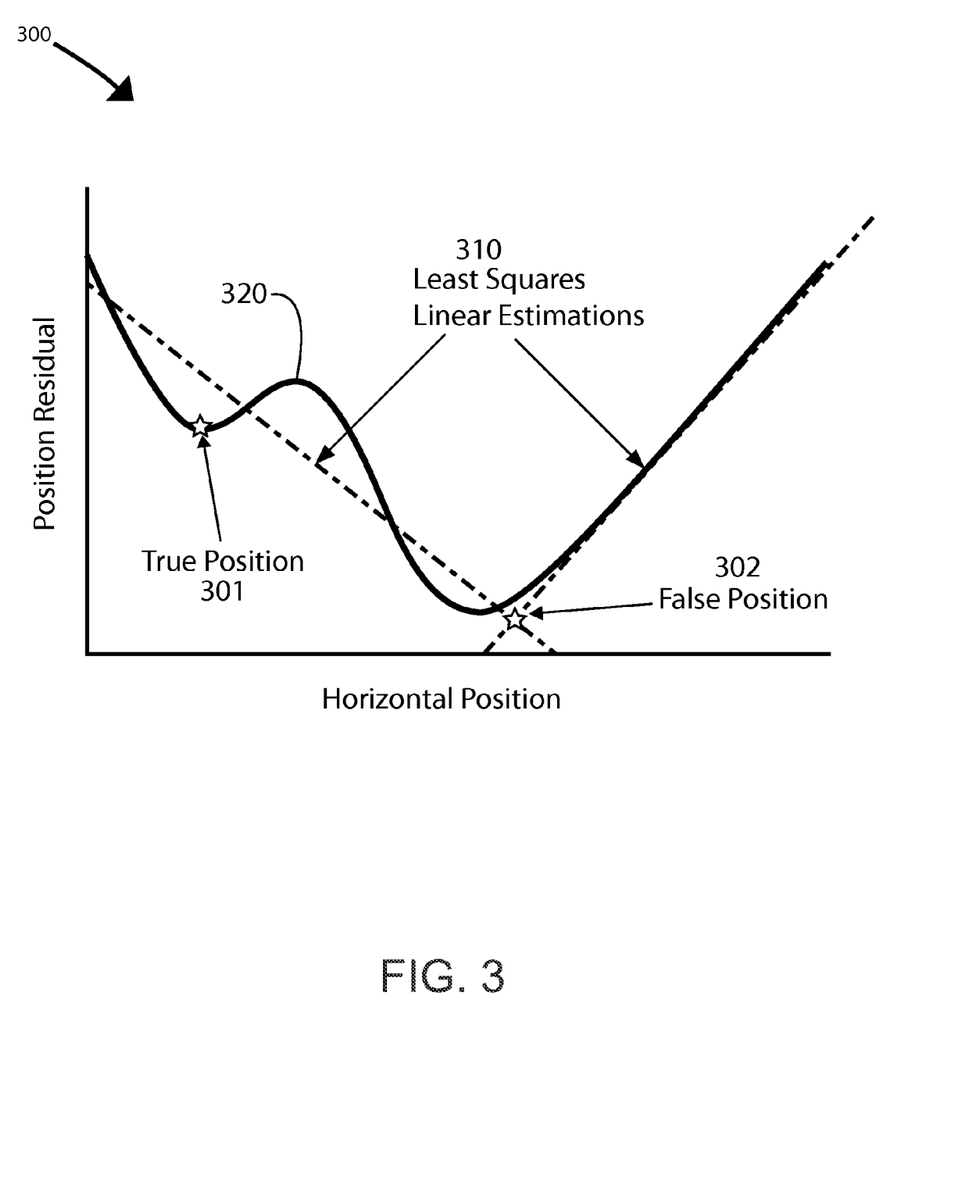
FIG. 3 illustrates a simplified graph of a position estimation method according to an embodiment of the present invention.

FIG. 3 illustrates a simplified graph of a position estimation method according to an embodiment of the present invention. To avoid large errant position estimates, a different technique has been devised to search for local minima around an estimated user position. This technique is referred to as a Regional Minimal Residual Estimation Filter or RMREF method. Graph 300 shows a comparison of a Least Squares Linear Estimation method 310 compared to RMREF method 320 according to an embodiment of the present invention. As shown, the Least Squares approach is oversimplified and results in the detection of the false position 302. However, the true position 301 is determined by the RMREF method 320.

In the RMREF solution, the user's position must be initialized by an outside source such as GPS, Inertial Navigation, Image-based position fix, or a solution based on an absolute fix using Wi-Fi data. Given a starting estimate of user position, the algorithm computes the total position residual at multiple points in a grid of known dimension and resolution.

The current RMREF solution solves for the total solution residual across a 2 dimensional search grid. The dimension of the search grid is set by the 2 axis covariance, Figure of Merit, or other indicator of relative uncertainty in user position. While computing the position residual across all of the possible locations can be more computationally complex than a Least Squares approach, it will allow for the local minimum (shown in FIG. 3) to be tracked over time. A lesser accuracy requirement or better initial confidence in the position estimate can allow a grid with much less resolution and fewer data points to be used. Theoretically, the RMREF search space could be as small as a 3×3 grid with 9 total computational points.

Figure 4:
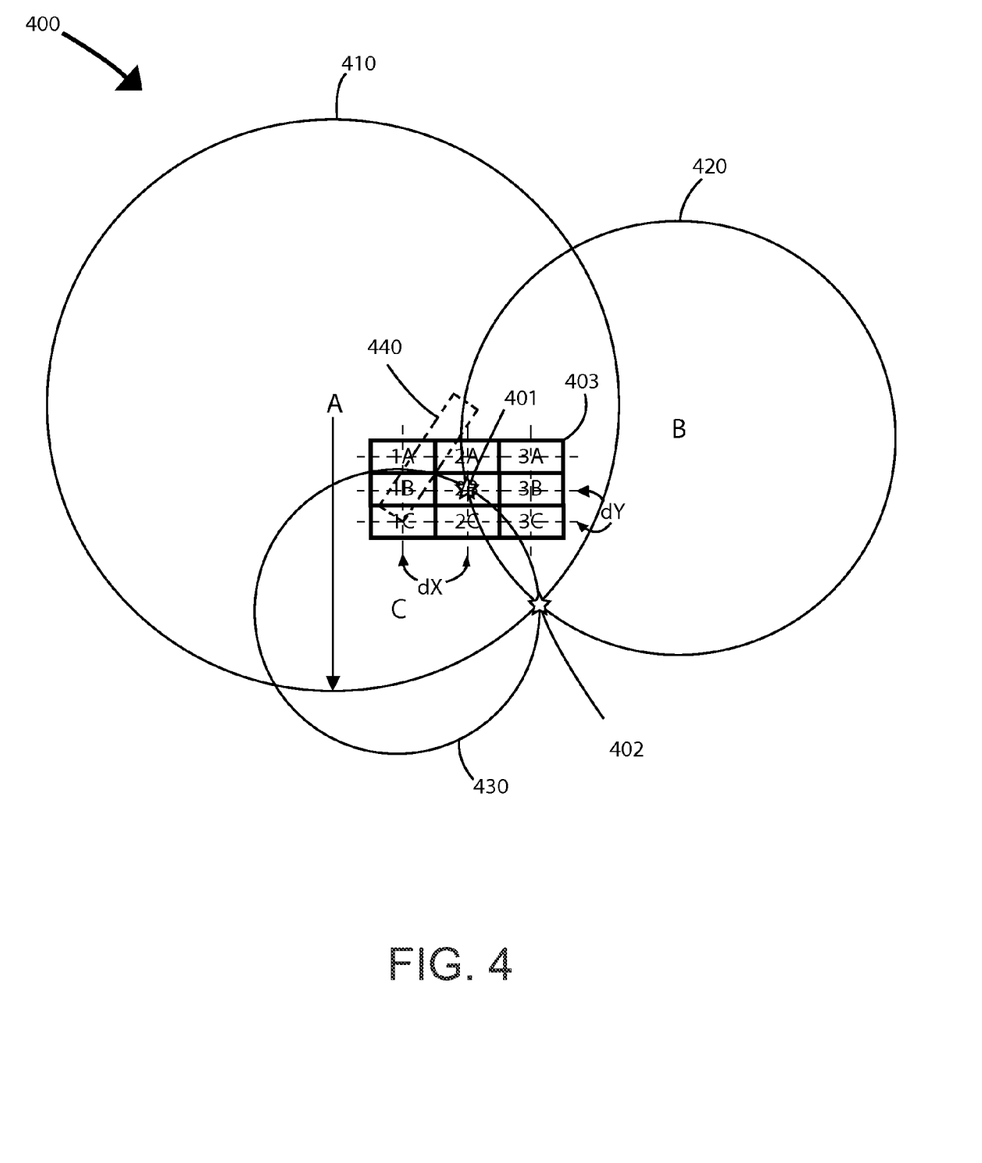
FIG. 4 illustrates a simplified diagram of position estimation method using multiple Wi-Fi access points with an RMREF method according to an embodiment of the present invention.

FIG. 4 illustrates a simplified diagram of position estimation method using multiple Wi-Fi access points with an RMREF method according to an embodiment of the present invention. Similar to FIGS. 1 and 2, this method 400 uses Wi-Fi fields of Wi-Fi sources A (410), B (420), C (430), which are affected by obstruction 440. Here, FIG. 4 shows an example of a 3×3 solution grid 403 centered about the true user position 401 (rather than the false position 402), which has been properly initialized from previous measurements, or an Inertial Navigation System. As an example implementation, the following equation will compute the total position residual for all 9 points in the RMREF solution:

$$\text{Position Residual}_{(x,y)} = \left( \sum_{n=1}^{\text{\# Access Points}} |\text{True Range}_n - \text{Computed Range}_n| \right)_{(x,y)}$$

Note that the Position Residual is a sum of the magnitude of the errors, and not the sum of the errors, thus it is a measure of total inconsistency for each candidate position solution. It is possible to compute the True Range for each point on the candidate position solution grid since all access point locations are known and the candidate position grid location is known. For each of the possible solution locations in the grid, the computed range based on received power levels does not change, therefore leading to a different residual for each grid location.

Figure 5:
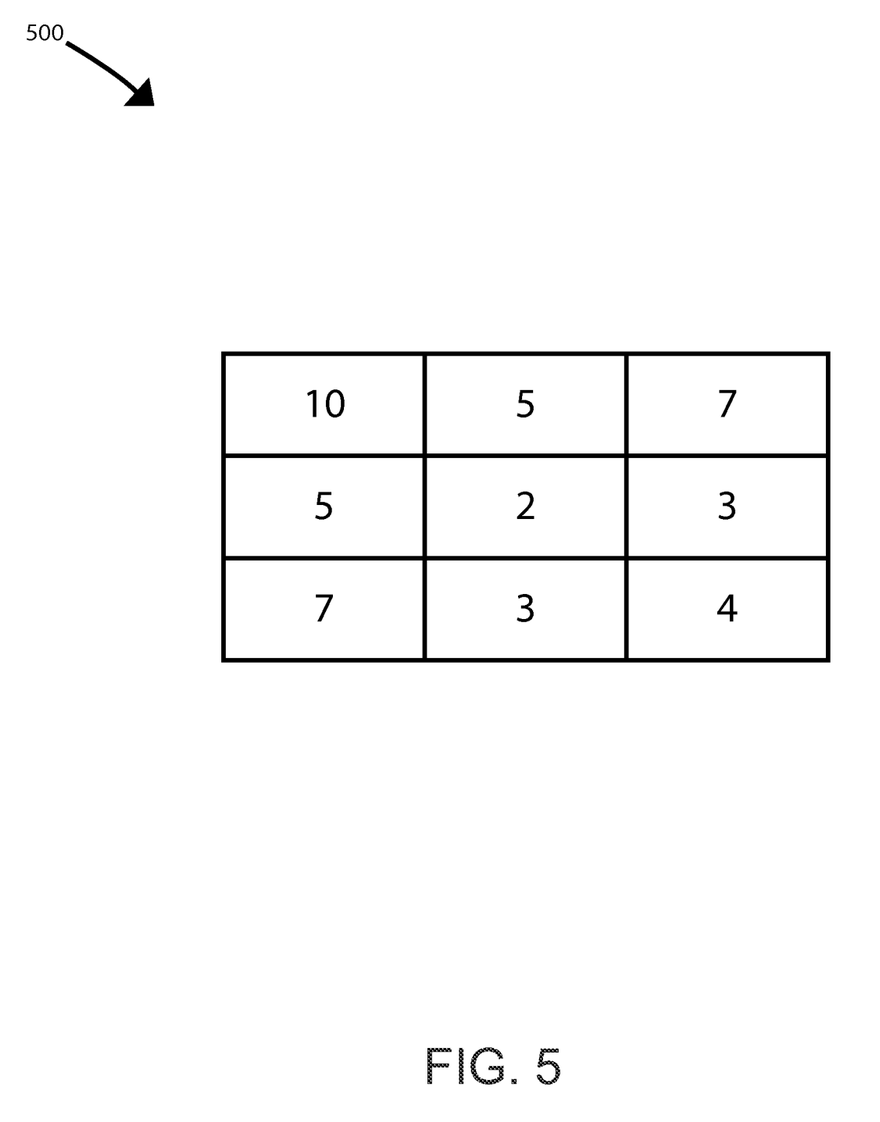
FIG. 5 illustrates a simplified table of results from an RMREF method according to an embodiment of the present invention.

FIG. 5 illustrates a simplified table of results from an RMREF method according to an embodiment of the present invention. FIG. 5 shows a probable result of the RMREF solution where there is a measureable residual still seen at the local minimum. It should be noted that the grid is not symmetric, which is evidence that nonlinear system properties are present.

Once a simple sorting algorithm or minimum search is run to determine the grid location with the smallest residual, its grid location is passed into any downstream processing as the position estimate. This position estimate may be passed directly to a user/application, or it can be used as a measurement or innovation into a navigation filter, such as a Kalman filter.

In an example, the present invention provides a computer-implemented method for determining a user position, implemented in a handheld user computing device programmed to perform the method, as outlined below.

601. Receive, in the handheld user computing device, a starting user position estimate from an outside initialization source;

602. Receive, in the handheld user computing device, a plurality of Wi-Fi signals from a plurality of Wi-Fi access points, each of the plurality of Wi-Fi signals being associated with one of the plurality of Wi-Fi access points;

603. Determine, in the handheld user computing device, a plurality of signal strength measurements, each of the signal strength measurements being associated with one of the plurality of Wi-Fi signals;

604. Determine, in the handheld user computing device, a plurality of access point locations, each of the access point locations being associated with one of the plurality of Wi-Fi access points;

605. Determine, in the handheld user device, a total solution residual across a two-dimensional solution grid using the starting user position estimate and the plurality of signal strength measurements and the plurality of access point locations, wherein determining the total solution residual comprises determining a position residual for each point in the two-dimensional solution grid;

606. Determine, in the handheld user device, an estimated user position based on the minimized position residual of the total solution residual; and 607. Perform other steps, as desired.

As shown, the present method has a sequence of steps, which can be varied, modified, replaced, reordered, expanded, contracted, or any combinations thereof. That is, the method repeats any of the above steps. Such steps may be performed alone or in combination with others, which are described or not even described. The steps can be performed in the order shown or in other orders, if desired. The steps also can be performed using a combination of hardware and software using other process steps. The steps also can be performed using hardware or other processes implemented using software and the like. Of course, there can be many other variations, modifications, and alternatives. Further details of the present method can be found throughout the present specification and more particularly below.

Figure 6:
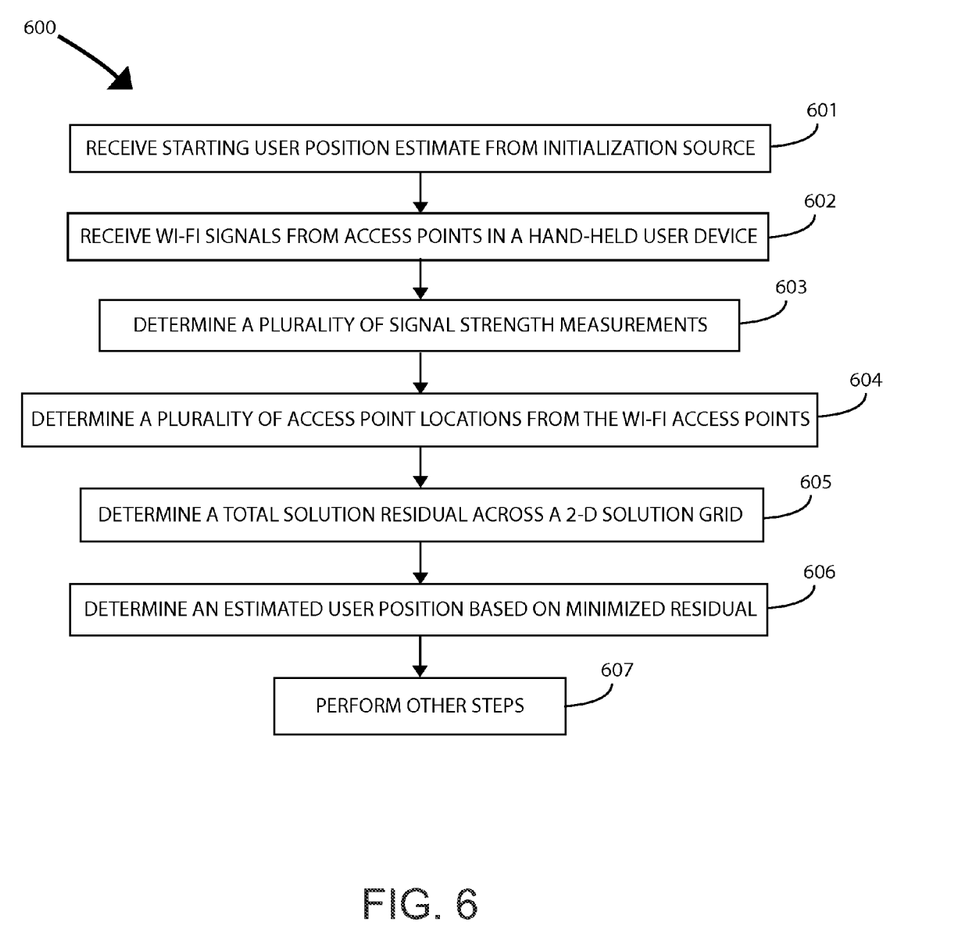
FIG. 6 is a simplified flow diagram of a method for estimating a position of a user according to an embodiment of the present invention.

FIG. 6 illustrates a simplified flow diagram of a method for estimating a position of a user according to an embodiment of the present invention. As shown, method 600 can include several steps being performed in a handheld computing device including receiving a starting user position estimate from an outside initialization source (601) and receiving a plurality of Wi-Fi signals from a plurality of Wi-Fi access points (602). Each of the plurality of Wi-Fi signals can be associated with one of the plurality of Wi-Fi access points. The outside initialization source can include a global positioning system (GPS), an inertial navigation device, an image-based position fix, or an absolute fix using Wi-Fi data, or the like.

In an embodiment, the method 600 can include determining a plurality of signal strength measurements (603), where each of the signal strength measurements can be associated with one of the plurality of Wi-Fi signals. A plurality of access point locations can be determined (604), where each of the access point locations being associated with one of the plurality of Wi-Fi access points. The method 600 can also include determining a total solution residual across a two-dimensional solution grid using the starting user position estimate and the plurality of signal strength measurements and the plurality of access point locations (605). The starting user position estimate can be used to determine a solution region for the two-dimensional solution grid.

In a specific embodiment, the process of determining the total solution residual can include determining a position residual for each point in the two-dimensional solution grid, as described previously. The determining of a position residual can include determining the sum of magnitude of the position errors across the plurality of Wi-Fi access points. The position errors can be the difference between a true range and a computed range, the true range being determined by the plurality of access point locations and the computed range being determined by the received power levels of each of the plurality of signal strength measurements.

The two-dimensional solution grid having dimensions N×M where N is greater than 2 and M is greater than 2 and can be determined by a 2-axis covariance, a Figure of Merit, or an indicator or relative uncertainty in user position. Furthermore, the method 600 can include determining in the handheld user device, an estimated user position based on the minimized position residual of the total solution residual within the solution region (606). Other steps can be performed as desired (607).

In various embodiments, the handheld user computing device includes an inertial navigation system or inertial sensing system, and also includes using the inertial navigation system or inertial sensing system to only search for regions of convergence near a most recent estimate of the user position. This method can include solving a two-dimensional solution grid of position residuals, or magnitudes of error between true and computed ranges, using signal strength measurements from multiple Wi-Fi access points in order to determine local minima of the position residuals indicating a user position. This method can be referred to as an RMREF method.

In an embodiment, the present invention provides a handheld user computing device specifically programed by executable software code to determine a user position. This device can include a physical sensor configured to determine a plurality of signal strength measurements in response to plurality of signals from a plurality of access points, a memory configured to store executable software, and a processor coupled to the physical sensor and the memory, wherein the processor is programmed by the executable software to perform the method steps as described previously.

Many benefits are achieved by the way of the present invention over conventional techniques. These benefits can include providing an efficient method of solving for local minima points vs. the absolute minima of the line of sight residuals, which can be used for navigation/position applications. This method also allows for better performance when integrated with an inertial navigation system to only search for regions of convergence near the most recent estimate.

Figure 7:
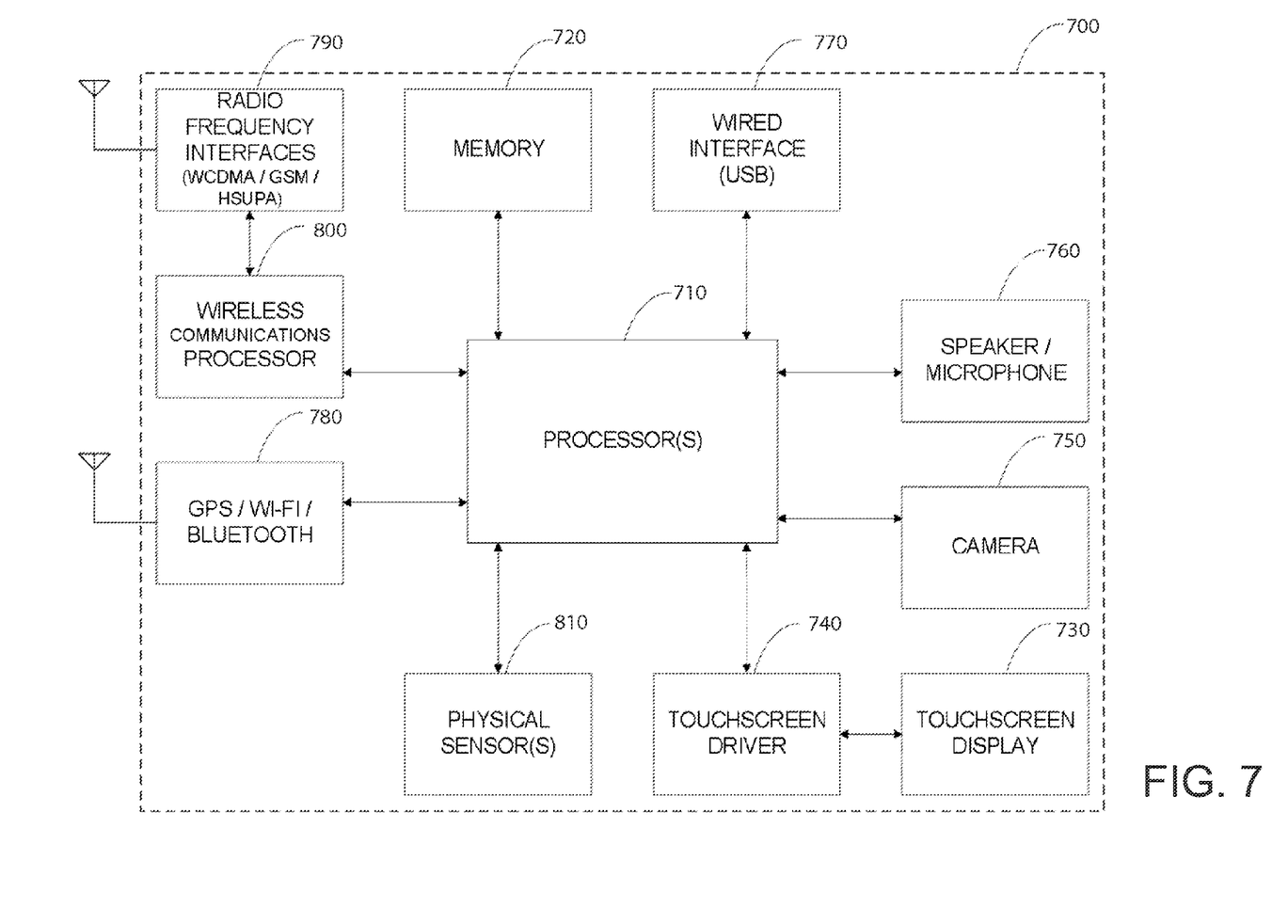
FIG. 7 illustrates a simplified functional block diagram of various embodiments of the present invention.

FIG. 7 illustrates a functional block diagram of various embodiments of the present invention. In FIG. 7, a computing device 700 typically includes an applications processor 710, memory 720, a touch screen display 730 and driver 740, an image acquisition device 750, audio input/output devices 760, and the like. Additional communications from and to computing device are typically provided by via a wired interface 770, a GPS/Wi-Fi/Bluetooth interface 780, RF interfaces 790 and driver 800, and the like. Also included in various embodiments are physical sensors 810.

In various embodiments, computing device 700 may be a hand-held computing device (e.g. Apple iPad, Apple iTouch, Dell Mini slate, Lenovo Skylight/IdeaPad, Asus EEE series, Microsoft Courier, Notion Ink Adam), a portable telephone (e.g. Apple iPhone, Motorola Droid, Google Nexus One, HTC Incredible/EVO 4G, Palm Pre series, Nokia N900), a portable computer (e.g. netbook, laptop), a media player (e.g. Microsoft Zune, Apple iPod), a reading device (e.g. Amazon Kindle, Barnes and Noble Nook), or the like.

Typically, computing device 700 may include one or more processors 710. Such processors 710 may also be termed application processors, and may include a processor core, a video/graphics core, and other cores. Processors 710 may be a processor from Apple (A4), Intel (Atom), NVidia (Tegra 2), Marvell (Armada), Qualcomm (Snapdragon), Samsung, TI (OMAP), or the like. In various embodiments, the processor core may be an Intel processor, an ARM Holdings processor such as the Cortex-A, -M, -R or ARM series processors, or the like. Further, in various embodiments, the video/graphics core may be an Imagination Technologies processor PowerVR-SGX, -MBX, -VGX graphics, an Nvidia graphics processor (e.g. GeForce), or the like. Other processing capability may include audio processors, interface controllers, and the like. It is contemplated that other existing and/or later-developed processors may be used in various embodiments of the present invention.

In various embodiments, memory 720 may include different types of memory (including memory controllers), such as flash memory (e.g. NOR, NAND), pseudo SRAM, DDR SDRAM, or the like. Memory 720 may be fixed within computing device 700 or removable (e.g. SD, SDHC, MMC, MINI SD, MICRO SD, CF, SIM). The above are examples of computer readable tangible media that may be used to store embodiments of the present invention, such as computer-executable software code (e.g. firmware, application programs), application data, operating system data or the like. It is contemplated that other existing and/or later-developed memory and memory technology may be used in various embodiments of the present invention.

In various embodiments, touch screen display 730 and driver 740 may be based upon a variety of later-developed or current touch screen technology including resistive displays, capacitive displays, optical sensor displays, electromagnetic resonance, or the like. Additionally, touch screen display 730 may include single touch or multiple-touch sensing capability. Any later-developed or conventional output display technology may be used for the output display, such as TFT-LCD, OLED, Plasma, trans-reflective (Pixel Qi), electronic ink (e.g. electrophoretic, electrowetting, interferometric modulating). In various embodiments, the resolution of such displays and the resolution of such touch sensors may be set based upon engineering or non-engineering factors (e.g. sales, marketing). In some embodiments of the present invention, a display output port, such as an HDMI-based port or DVI-based port may also be included.

In some embodiments of the present invention, image capture device 750 may include a sensor, driver, lens and the like. The sensor may be based upon any later-developed or convention sensor technology, such as CMOS, CCD, or the like. In various embodiments of the present invention, image recognition software programs are provided to process the image data. For example, such software may provide functionality such as: facial recognition, head tracking, camera parameter control, or the like.

In various embodiments, audio input/output 760 may include conventional microphone(s)/speakers. In some embodiments of the present invention, three-wire or four-wire audio connector ports are included to enable the user to use an external audio device such as external speakers, headphones or combination headphone/microphones. In various embodiments, voice processing and/or recognition software may be provided to applications processor 710 to enable the user to operate computing device 700 by stating voice commands. Additionally, a speech engine may be provided in various embodiments to enable computing device 700 to provide audio status messages, audio response messages, or the like.

In various embodiments, wired interface 770 may be used to provide data transfers between computing device 700 and an external source, such as a computer, a remote server, a storage network, another computing device 700, or the like. Such data may include application data, operating system data, firmware, or the like. Embodiments may include any later-developed or conventional physical interface/protocol, such as: USB 2.0, 3.0, micro USB, mini USB, Firewire, Apple iPod connector, Ethernet, POTS, or the like. Additionally, software that enables communications over such networks is typically provided.

In various embodiments, a wireless interface 780 may also be provided to provide wireless data transfers between computing device 700 and external sources, such as computers, storage networks, headphones, microphones, cameras, or the like. As illustrated in FIG. 7, wireless protocols may include Wi-Fi (e.g. IEEE 802.11a/b/g/n, WiMax), Bluetooth, IR and the like.

GPS receiving capability may also be included in various embodiments of the present invention, however is not required. As illustrated in FIG. 7, GPS functionality is included as part of wireless interface 780 merely for sake of convenience, although in implementation, such functionality is currently performed by circuitry that is distinct from the Wi-Fi circuitry and distinct from the Bluetooth circuitry.

Additional wireless communications may be provided via RF interfaces 790 and drivers 800 in various embodiments. In various embodiments, RF interfaces 790 may support any future-developed or conventional radio frequency communications protocol, such as CDMA-based protocols (e.g. WCDMA), GSM-based protocols, HSUPA-based protocols, or the like. In the embodiments illustrated, driver 800 is illustrated as being distinct from applications processor 710. However, in some embodiments, these functionality are provided upon a single IC package, for example the Marvel PXA330 processor, and the like. It is contemplated that some embodiments of computing device 700 need not include the RF functionality provided by RF interface 790 and driver 800.

FIG. 7 also illustrates computing device 700 to include physical sensors 810. In various embodiments of the present invention, physical sensors 810 can be single axis or multi-axis Micro-Electro-Mechanical Systems (MEMS) based devices being developed by M-cube, the assignee of the present patent application. Physical sensors 810 can include accelerometers, gyroscopes, pressure sensors, magnetic field sensors, bio sensors, and the like. In other embodiments of the present invention, conventional physical sensors 810 from Bosch, STMicroelectronics, Analog Devices, Kionix or the like may be used.

In various embodiments, any number of future developed or current operating systems may be supported, such as iPhone OS (e.g. iOS), WindowsMobile (e.g. 7), Google Android (e.g. 2.2), Symbian, or the like. In various embodiments of the present invention, the operating system may be a multi-threaded multi-tasking operating system. Accordingly, inputs and/or outputs from and to touch screen display 730 and driver 740 and inputs/or outputs to physical sensors 810 may be processed in parallel processing threads. In other embodiments, such events or outputs may be processed serially, or the like. Inputs and outputs from other functional blocks may also be processed in parallel or serially, in other embodiments of the present invention, such as image acquisition device 750 and physical sensors 810.

FIG. 7 is representative of one computing or micro-processing device 700 capable of embodying the present invention. In one embodiment, the DOC can be implanted on chip with sensors instead of using an external processor. The previously described methods of operation can be implemented with on-chip logic or through a micro-processor in the same device or in a separate chip within the hand-held device. It will be readily apparent to one of ordinary skill in the art that many other hardware and software configurations are suitable for use with the present invention. Embodiments of the present invention may include at least some but need not include all of the functional blocks illustrated in FIG. 7. For example, in various embodiments, computing device 700 may lack image acquisition unit 750, or RF interface 790 and/or driver 800, or GPS capability, or the like. Additional functions may also be added to various embodiments of computing device 700, such as a physical keyboard, an additional image acquisition device, a trackball or trackpad, a joystick, or the like. Further, it should be understood that multiple functional blocks may be embodied into a single physical package or device, and various functional blocks may be divided and be performed among separate physical packages or devices.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A computer-implemented method for determining a user position, implemented in a handheld user computing device programmed to perform the method comprising:
   receiving, in the handheld user computing device, a starting user position estimate from an outside initialization source;
   determining, in the handheld user computing device, a total solution residual across a two-dimensional solution grid of potential positions using a plurality of Wi-Fi access points, wherein determining the total solution residual comprises determining a position residual for each point in the two-dimensional solution grid,
   wherein determining a position residual comprises determining the sum of magnitude of the position errors across the plurality of Wi-Fi access points, the position errors being the difference between a true range and a computed range, the true range being determined by the known locations of the plurality of Wi-Fi access points and the computed range being determined by the received power levels of each of the plurality of Wi-Fi access points; and
   determining, in the handheld user computing device, an estimated user position based on a minimized position residual of the total solution residual.

2. The method of claim 1 wherein the outside initialization source comprises a global positional system (GPS), an inertial navigation device, an image-based position fix, or an absolute fix using Wi-Fi data.

3. The method of claim 1 wherein the two-dimensional solution grid having dimensions N×M where N is greater than 2 and M is greater than 2.

4. The method of claim 1 wherein the dimensions of the two-dimensional solution grid are determined by a 2-axis covariance, a Figure of Merit, or an indicator of relative uncertainty in user position.

5. The method of claim 1 wherein the handheld user computing device comprises an inertial navigation system or inertial sensing system, and further comprising using the inertial navigation system or inertial sensing system to only search for regions of convergence near a most recent estimate of the user position.

6. A computer-implemented method for determining user position, implemented in a handheld user computing device programmed to perform the method comprising:
   receiving, in the handheld user computing device, a starting user position estimate from an outside initialization source;
   receiving, in the handheld user computing device, a plurality of Wi-Fi signals from a plurality of Wi-Fi access points, each of the plurality of Wi-Fi signals being associated with one of the plurality of Wi-Fi access points;
   determining, in the handheld user computing device, a plurality of signal strength measurements, each of the signal strength measurements being associated with one of the plurality of Wi-Fi signals;

determining, in the handheld user computing device, a plurality of access point locations, each of the access point locations being associated with one of the plurality of Wi-Fi access points;

determining, in the handheld user device, a total solution residual across a two-dimensional solution grid using the starting user position and the plurality of signal strength measurements and the plurality of access point locations, wherein determining the total solution residual comprises determining a position residual for each point in the two-dimensional search grid, the starting user position estimate being used to determine a solution region for the two-dimensional solution grid; and determining, in the handheld user device, an estimated user position based on the minimized position residual of the total solution residual within the solution region;

wherein determining the estimated user position includes solving local minima points versus the absolute minima of a line of sight residuals.

7. The method of claim 6 wherein the outside initialization source comprises a global position system (GPS), an inertial navigation device, an image-based position fix, or an absolute fix using Wi-Fi data.

8. The method of claim 6 wherein the two-dimensional solution grid having dimensions N×M where N is greater than 2 and M is greater than 2.

9. The method of claim 6 wherein the dimensions of the two-dimensional solution grid are determined by a 2-axis covariance, a Figure of Merit, or an indicator of relative uncertainty in user position.

10. The method of claim 6 wherein determining a position residual comprises determining the sum of magnitude of the position errors across the plurality of Wi-Fi access points, the position errors being the difference between a true range and a computed range, the true range being determined by the plurality of access point locations and the computed range being determined by the received power levels of each of the plurality of signal strength measurements.

11. The method of claim 6 wherein the handheld user computing device comprises an inertial navigation system or inertial sensing system, and further comprising using the inertial navigation system or inertial sensing system to only search for regions of convergence near a most recent estimate of the user position.

12. The method of claim 6 wherein determining the estimated user position includes determining the estimated user position using power estimates from multiple Wi-Fi access points.

13. A handheld user computing device specifically programmed by executable software code to determine a user position, the hand-held computing device comprising:

a physical sensor configured to determine a plurality of signal strength measurements in response to plurality of signals from a plurality of access points;

an inertial navigation system or inertial sensing system;

a memory configured to store executable software; and a processor coupled to the physical sensor and the memory, wherein the processor is programmed by the executable software to:

receive a starting user position estimate from an outside initialization source;

receive a plurality of Wi-Fi signals from a plurality of Wi-Fi access points, each of the plurality of Wi-Fi signals being associated with one of the plurality of Wi-Fi access points;

determine a plurality of signal strength measurements, each of the signal strength measurements being associated with one of the plurality of Wi-Fi signals;

determine a plurality of access point locations, each of the access point locations being associated with one of the plurality of Wi-Fi access points;

determine a total solution residual across a two-dimensional solution grid using the starting user position estimate and the plurality of signal strength measurements and the plurality of access point locations, wherein determining the total solution residual comprises determining a position residual for each point in the two-dimensional search grid, the starting user position estimate being used to determine a solution region for the two-dimensional solution grid;

determine an estimated user position based on the minimized position residual of the total solution residual within the solution region; and using the inertial navigation system or inertial sensing system to only search for regions of convergence near a most recent estimate of the user position.

14. The device of claim 13 wherein the processor is programmed to receive a starting user position estimate from an outside initialization source comprising a global positioning system (GPS), an inertial navigation device, an image-based position fix, or an absolute fix using Wi-Fi data.

15. The device of claim 13 wherein the processor is programmed to determine a total solution residual across the two-dimensional solution grid wherein the two-dimensional solution grid includes dimensions N×M where N is greater than 2 and M is greater than 2.

16. The device of claim 13 wherein the processor is programmed to determine a total solution residual across the two-dimensional solution grid wherein the dimensions of the two-dimensional solution grid are determine by a 2-axis covariance, a Figure of Merit, or an indicator of relative uncertainty in user position.

17. The device of claim 13 wherein the processor is programmed to determine a position residual including determining the sum of magnitude of the position errors across the plurality of Wi-Fi access points, the position errors being the difference between a true range and a computed range, the true range being determined by the plurality of access points locations and the computed range being determined by the received power levels of each of the plurality of signal strength measurements.

\* \* \* \* \*